April 27, 1926.

O. H. ESCHHOLZ 1,582,671

PROTECTED WELDING CIRCUITS

Filed August 22, 1922

WITNESSES:
C. N. Cochran
W. B. Jaspert.

INVENTOR
Otto N. Eschholz.
BY
Wesley G. Carr
ATTORNEY

Patented Apr. 27, 1926.

1,582,671

UNITED STATES PATENT OFFICE.

OTTO H. ESCHHOLZ, OF PITTSBURGH, PENNSYLVANIA, ASSIGNOR TO WESTINGHOUSE ELECTRIC & MANUFACTURING COMPANY, A CORPORATION OF PENNSYLVANIA.

PROTECTED WELDING CIRCUITS.

Application filed August 22, 1922. Serial No. 583,480.

*To all whom it may concern:*

Be it known that I, OTTO H. ESCHHOLZ, a citizen of the United States, and a resident of Pittsburgh, in the county of Allegheny and State of Pennsylvania, have invented a new and useful Improvement in Protected Welding Circuits, of which the following is a specification.

My invention relates to arc welding systems, more especially to arc welding systems used in connection with street railway work and it is among the objects thereof to provide a welding system which protects the operator from the relatively high voltages employed in the supply circuit.

It is another object of this invention to provide a welding system which shall be of simple and inexpensive construction and efficient in its operation.

In my Patent No. 1,329,233, issued January 27, 1920, is disclosed an electric welding system employing relatively high voltages which affords protection to the operator.

My present invention is directed to an improvement in such systems which greatly simplifies the circuits and eliminates some of the apparatus employed therein.

In the accompanying drawing constituting a part hereof and in which like reference characters designate like parts;

Figure 1:
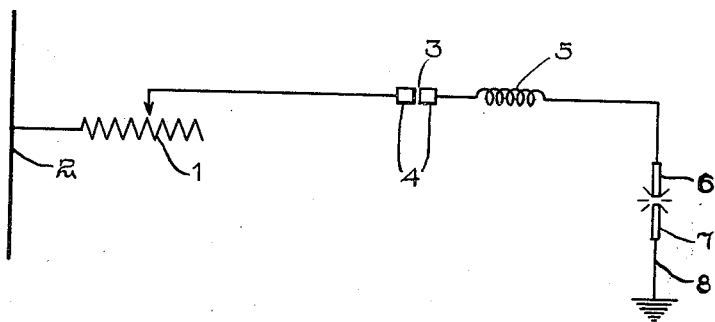
Fig. 1 is a diagrammatic view of a welding system embodying the principles of my invention.

Referring to Fig. 1, the welding circuit comprises a variable-resistance device 1 having one side connected to a supply circuit 2, such as a trolley line of a street railway system, and having its other side connected in series with a manually operable switch 3. One of the terminals 4 of the switch 3 is connected to a series holding coil 5 one end of which is connected to an electrode 6 which is in co-operative alinement with an electrode 7 connected to ground by a terminal lead 8.

Figure 2:
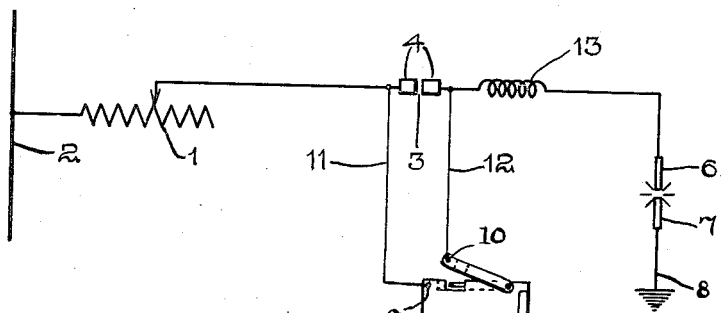
Fig. 2 is a diagrammatic view of a welding system having a modified form of switch.

In Fig. 2, the switch 3 is shunted by the contacts 9 and 10 of a suitable hand or foot-actuated device, which is connected across the terminals 4 by suitable leads 11 and 12 and one of the terminals 4 is provided with a series closing and holding coil 13 connected in series with the electrode 6.

Figure 3:
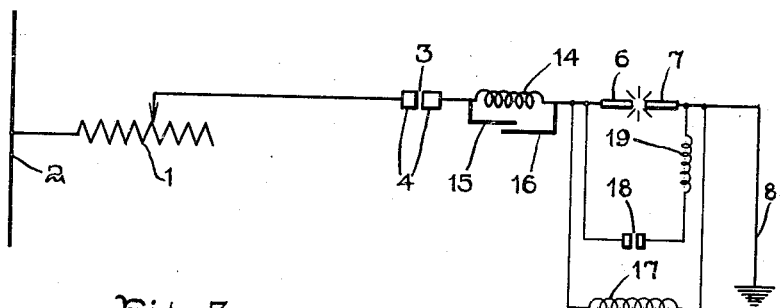
Fig. 3 is another diagrammatic view showing still further modifications in the welding circuit.

In Fig. 3, the circuit comprises a variable-resistance device 1 in series with the main switch 3 that has one of its contacts 4 connected in series with a holding coil 14 and electrode 6. The coil 14 is provided with a pair of short circuiting contacts 15 and 16, and a shunt closing coil 17 is connected across the electrodes 6 and 7 which are further provided with a switch 18 having a holding coil 19 in series therewith, the two series-connected devices being connected in shunt to the electrodes.

The operation of these systems is briefly as follows: in the system illustrated in Fig. 1, the switch 3 is manually closed by the operator, the electrodes 6 and 7 being in contact to establish a circuit from the line to ground. The normal strength of the coil 5 is such as to maintain contact of the terminals 4 as long as the welding current of the circuit is normal. An arc is established between the electrodes 6 and 7 in the usual manner by separating them. When the arc is lengthened by separating the electrodes, the voltage across the arc increases rapidly and would ordinarily be dangerous to the operator but the current drops proportionally to the increase in the voltage, consequently weakening the field of the coil 5 to permit or cause the switch 3 to open.

In Fig. 2, the switch 3 is closed by effecting engagement of the contacts 9 and 10 through the operation of a suitable hand or foot-actuated device. A circuit is thus established through the closing coil 13 which closes the switch 3 and thereby short circuits the switch contacts 9 and 10. The closing coil 13 also functions as a holding coil in the same manner as the coil 5 in the circuit of Fig. 1, so that, when the arc is lengthened by the separation of the electrodes 6 and 7, the switch 3 is permitted or caused to open by the weakening of the coil 13, thus providing protection for the operator.

Referring to Fig. 3, a circuit through the electrodes 6 and 7 is established by manually closing the main switch 3, which energizes the holding coil 14 and the closing coil 17 that is connected in shunt to the electrodes. The coil 17 closes the switch 18 which is maintained in its closed position by the holding coil 19 until an arc is established by contacting and then separating the electrodes which short-circuits the coils 17 and 19, thereby causing the switch 18 to open. The contacts 15 and 16 may be brought into engagement by the operator to short-circuit the holding coil 14 and thus permit or cause the main switch 3 to open.

During the normal operation of the arc, a negligible current flows through the shunt circuit including the coil 17 but, if the arc is lengthened, the voltage is increased and an increased current flows through the shunt coil 17 which automatically closes the switch 18, thereby extinguishing the arc and providing safety to the operator.

Since the main switch 3 (Fig. 3) remains closed until the contacts 15 and 16 are engaged, the welding circuit is not interrupted although the arc may be extinguished.

It will be readily seen from the above description of my invention that welding systems of this kind eliminate the high-voltage danger to which the operator would otherwise be subjected and that such protected welding circuits provide an efficient means for welding rail joints and bonds.

Although I have described a specific embodiment of my invention, it will be obvious to those skilled in the art that various modifications may be made in the details of the welding circuits without departing from the principles herein set forth. For instance, the main and auxiliary switches may comprise any suitable manually or automatically operated contact members, and the holding and closing coils may be disposed in any suitable relation to comprise a welding circuit through a pair of electrodes.

I claim as my invention:

1. In an arc welding system, the combination with the work to be welded and the movable arcing electrode, of means for grounding the work, a source of relatively high potential having one terminal grounded, an impedance device in series connection between said source and the movable electrode for reducing the potential at the latter, means including an electromagnetic switch responsive to excessive arc voltage for providing a by-pass circuit around the arc for reducing the potential at the movable electrode, and means responsive to the current in said by-pass circuit for preventing the by-pass circuit from immediately reopening upon the reduction of said electrode potential.

2. In an arc welding system, the combination with the work to be welded and the movable arcing electrode, of means for grounding the work, a source of relatively high potential having one terminal grounded, an impedeance device in series connection between said source and the movable electrode for reducing the potential at the latter, means responsive to excessive arc voltages for providing a by-pass circuit around the arc for reducing the potential at the movable electrode, and electro-responsive means for holding said by-pass circuit closed until the arc is again struck and for reopening said by-pass circuit upon contacting of the movable electrode with the work.

3. In an arc welding system, the combination with the work to be welded and the movable arcing electrode, of means for grounding the work, a source of relatively high potential having one terminal grounded, an impedance device in series connection between said source and the movable electrode for reducing the potential at the latter, means responsive to excessive arc voltages for providing a by-pass circuit around the arc for reducing the potential at the movable electrode, electro-responsive means for holding said by-pass circuit closed until the arc is again struck and for reopening said by-pass circuit upon contacting of the movable electrodes with the work, and an underload circuit breaker in series with said impedance device for automatically protecting the operator from the high potential of said source.

4. An arc welding apparatus comprising the arc electrodes and an electromagnetic switch connected in shunt relation to said electrodes, said switch having a serially connected retaining coil and a voltage-responsive coil connected in shunt relation to said electrodes.

5. An arc welding apparatus comprising the arc electrodes, an underload circuit breaker in series therewith, and an electromagnetic switch connected in shunt relation to said electrodes, said switch having a serially connected retaining coil and a voltage-responsive coil connected in shunt relation to said electrodes.

6. An arc welding apparatus comprising the arc electrodes, means responsive to excessive arc voltages for providing a by-pass circuit around the arc, and means responsive to the current in said by-pass circuit for preventing the by-pass circuit from immediately reopening.

7. An arc welding apparatus comprising the arc electrodes, means responsive to excessive arc voltages for providing a by-pass circuit around the arc, and electro-responsive means for holding said by-pass circuit closed until the arc is again struck and for reopening said by-pass circuit upon contacting of the arc electrodes.

8. An arc welding apparatus comprising the arc electrodes and electro-responsive means therefor, said means being operable upon excessive separation of the electrodes to establish and maintain a by-pass circuit around the arc electrodes and operable upon contacting of the electrodes to render said by-pass circuit inoperative.

9. In an electric-arc welding system, the combination with a supply circuit, of a pair of electrodes and automatic means associated therewith for limiting the voltage across said electrodes on open circuit, said automatic means comprising a variable series resistance connected to the supply circuit, a manually operative main switch having a holding coil adapted to mantain engagement of the contacts of said switch for a predetermined voltage across the electrodes, a closing coil shunted across said electrodes adapted to close a short-circuiting switch and a holding coil to maintain contact of said switch until an arc is established.

10. In an electric-arc welding system, the combination with a supply circuit, of a variable resistance connected to said supply circuit, a manually operative switch in series therewith, a series holding coil connected to said switch, a pair of short-circuiting contacts for said holding coil, a pair of electrodes in series with said holding coil, means for connecting one of said electrodes to ground, a shunt closing coil connected across said electrodes and a switch having a holding coil in series with one of its terminals shunt connected across said electrodes and responsive to said shunt holding coil.

In testimony whereof, I have hereunto subscribed my name this 16th day of August 1922.

OTTO H. ESCHHOLZ.